United States Patent [19]

Schiel

[11] Patent Number: 4,796,452
[45] Date of Patent: Jan. 10, 1989

[54] SETTING DEVICE FOR ADJUSTING THE POSITION OF A ROLL

[75] Inventor: Christian Schiel, Heidenheim, Fed. Rep. of Germany

[73] Assignee: J. M. Voith GmbH, Fed. Rep. of Germany

[21] Appl. No.: 29,859

[22] Filed: Mar. 24, 1987

[30] Foreign Application Priority Data

Mar. 26, 1986 [DE] Fed. Rep. of Germany ....... 3610107

[51] Int. Cl.$^4$ .................. B21B 31/32; B21B 35/00; B30B 3/04
[52] U.S. Cl. .................. 72/245; 29/116.2; 72/237; 72/249; 100/168; 100/170; 100/172
[58] Field of Search .............. 72/245, 247, 243, 241, 72/237, 20, 249; 29/116 AD, 116 R, 113 AD, 113 R; 100/162 B, 170, 168, 169, 171, 172, 176, 47

[56] References Cited

U.S. PATENT DOCUMENTS

| | | |
|---|---|---|
| 3,060,843 | 10/1962 | Moore et al. |
| 3,443,295 | 5/1969 | Denoyer et al. |
| 3,600,273 | 8/1971 | McCarrick et al. |
| 3,885,283 | 5/1975 | Biondetti |
| 4,392,288 | 7/1983 | Anstotz et al. |
| 4,414,890 | 11/1983 | Schiel et al. |
| 4,438,695 | 3/1984 | Maier et al. |
| 4,580,429 | 4/1986 | Gilvar ......................... 72/245 X |

FOREIGN PATENT DOCUMENTS

| | | |
|---|---|---|
| 2261990 | 6/1974 | Fed. Rep. of Germany . |
| 3007112 | 9/1981 | Fed. Rep. of Germany . |
| 0593724 | 12/1977 | Switzerland ............... 72/245 |
| 2025480A | 1/1980 | United Kingdom . |
| 2054758A | 2/1981 | United Kingdom . |

OTHER PUBLICATIONS

Acetalhomopolymer als Lagerwerkstoff fur Werkzeuge, Pressen und Werkzeugmachinen, Wilfried Ensinger and Dieter Flieger, Machinenmarkt 79(1973)33, pp. 720–723.

Primary Examiner—Robert L. Spruill
Assistant Examiner—Steven B. Katz
Attorney, Agent, or Firm—Ostrolenk, Faber, Gerb & Soffen

[57] ABSTRACT

A setting device for adjusting the position of a roll with respect to a mating roll, as in the press section of a paper machine, or the like. A roll trunnion or journal at the end of the roll is received in a bearing which is supported in a bearing housing that is axially outward of the roll. The outer part of the bearing is in turn supported to an actuator which is shiftable to move the roll transversely of its axis with respect to the mating roll. A base plate hydraulically supports and raises the actuator for the bearing housing. A guide plate supported to the base plate extends past the roll trunnion or journal. Linear motion guide elements for guiding the motion of the bearing housing under the influence of the actuator are provided. They are guide claws on the bearing housing which wrap around the guide plate and move along it. An additional actuator piston operates on the roll trunnion or journal to move it in the opposite direction from the actuator.

20 Claims, 3 Drawing Sheets

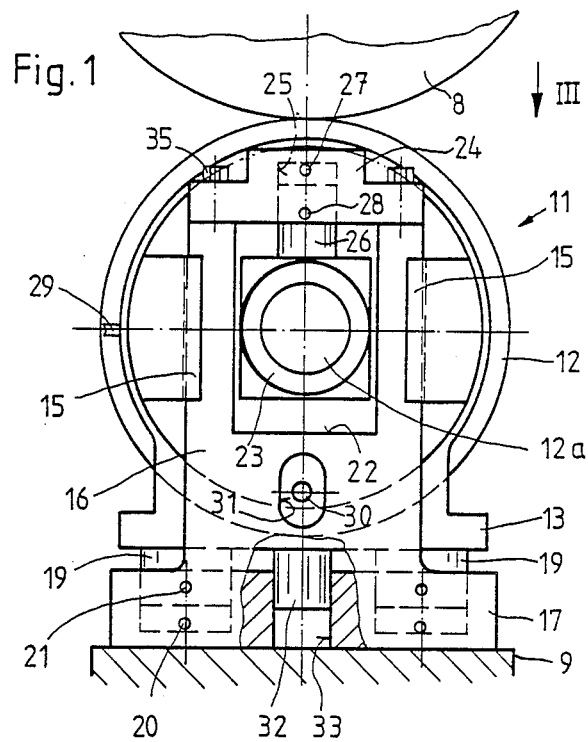
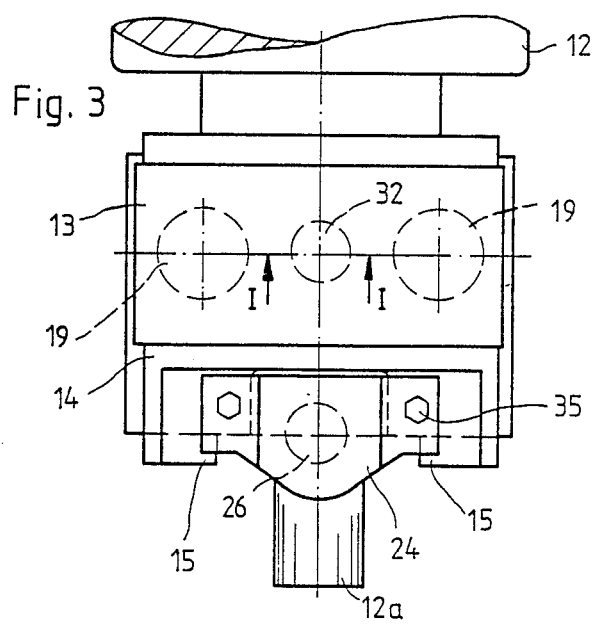

SETTING DEVICE FOR ADJUSTING THE POSITION OF A ROLL

BACKGROUND OF THE INVENTION

1. Field of the Invention

The invention relates to a setting device for changing the position of a roll with respect to a mating roll. Such a setting device enables the roll to be shifted transversely to its axis in order to bring the roll into contact with a mating roll and press it thereagainst or to move it clear of the mating roll. A preferred field of application for such a setting device is in the wet pressing or smoothing sections of paper making machines. Other applications include calenders for plastics and rolling mills.

2. The Prior Art

U.S. Pat. No. 3,600,273 describes the type of setting device most frequently used for changing the position of a roll. The roll bearings are located in bearing housings. Those housings are arranged on pivoting levers which may be moved by double acting actuator cylinders. Such an arrangement is very elaborate and requires much space.

U.S. Pat. No. 3,885,283 describes a press roll which has a device for adjusting roll flexion. The roll shell supported on a non-rotary beam is able to be set normally in relation to the beam. The mechanism for providing for such adjustability may also be used to move the roll shell clear of the mating roll. One drawback of this system is that if the complexity of manufacture is to be kept within reasonable limits, the adjustment motion is relatively small.

The setting devices in German Unexamined Specification DE-OS No. 2,929,942 and German Unexamined Specification DE-OS No. 3,007,112 call for a stationary bearing housing at each end of the roll. Within the housing, there is a sliding bearing with an associated setting device and linear guide elements. In comparison with the construction of U.S. Pat. No. 3,885,283, the devices of German Unexamined Specification DE-OS No. 2,929,942 and German Unexamined Specification DE-OS No. 3,007,112 provide for large setting strokes. Furthermore, in comparison with the arrangement of U.S. Pat. No. 3,600,273, the amount of space needed for the setting device is small. However, there is the disadvantage that the bearing accommodating the journal and arranged inside the setting device has a much smaller diameter than the external diameter of the rotary roll member. For this reason, it will be seen from FIG. 1 in German Unexamined Specification DE-OS No. 3,007,112 that only the end trunnion of a non-rotary beam is accommodated in the adjustable bearing, whereas the rotary roll shell is bearinged in the end part of the press zone, that is, clear of the setting device, on the non-rotary beam. Another bearing arrangement in many cases is to be preferred to the bearing arrangement in accordance with German Unexamined Specification DE-OS No. 3,007,112. That preferred arrangement, in U.S. Patent No. 4,414,890, may not be accommodated in the setting device of German Unexamined Specification DE-OS No. 3,007,112 because there is not enough space for it.

Furthermore, standard paper making machine rolls (i.e. those without any means for compensating for flexion), which have journals and which are designed for large machine widths, generally require bearings which are so large that they would take up too much space for those bearings to be employed in the setting device of German Unexamined Specification DE-OS No. 3,007,112.

Theoretically, it would be conceivable to so enlarge the stationary bearing housing of the setting device of German Unexamined Specification DE-OS No. 3,007,112 that larger moving bearings and their associated actuators might be accommodated in the bearing housing. However, the space available in paper making machinery for the bearing housings is frequently so restricted that it is not possible to increase the size of the bearing housings.

SUMMARY OF THE INVENTION

One object of the present invention is to so improve the setting device of German Unexamined Specification DE-OS No. 3,007,112 for changing the position of a roll so that it is possible for larger bearings than hitherto to be arranged within the setting device and without the outline of the setting device extending substantially past the space delimited by the external diameter of the roll member. At the same time, the setting stroke is to be comparatively large, that is, on the order of 20 to 100 mm.

The setting device according to the invention is used with a roll and may be used with either a hollow roll or a solid roll. The roll has stationary, that is, non-rotating roll trunnions at its ends, or it has roll journals at its ends which rotate with the roll. At each roll end there is a bearing in which either the roll trunnion or the roll journal is supported. That bearing is placed in a surrounding bearing housing which shifts together with the bearing in it and thus with the roll supported in the bearing, in directions transversely of the axis of the roll. Actuator means are attached to the bearing housing to move it transversely to the roll axis. Preferably, the actuator means are disposed at the side of the roll trunnion or journal that is opposite to the mating roll against which the roll position is adjusted. Preferably also, the center of the actuator means is at least approximately in the center of the bearing measured in the direction across or transverse to the axis of the roll and also measured along the axis of the roll.

Linear guide elements are provided for guiding generally linear shifting of the bearing housing transversely of the axis of the roll. The linear guide elements are separate from the actuator means. Linear guide elements on the bearing housing cooperate with guide elements on a stationary support for both the actuator means and bearing housing. The guide elements slide by each other and guide the linear motion of the bearing housing.

The actuator means and the linear guide elements, which are separate from the actuator means, are not accommodated within a stationary bearing housing, but are instead disposed axially of and outside the adjustable bearing housing. However, in order to ensure that the setting device is within a space delimited by the external diameter of the roll, the linear guide elements are arranged at the external end face of the adjustable bearing housing.

Stated differently, the linear guide elements are no longer placed so as to be concentric to the bearing of the roll trunnion as in German Unexamined Specification DE-OS No. 3,007,112. Instead, they are offset laterally from the bearing radially outward from the roll axis. This arrangement opens up the following possibilities. In lieu of the bearing ring, which is considerably limited in its thickness, in German Unexamined Specification DE-OS No. 3,077,112, it is now possible to employ a standard bearing housing, for example, a bearing outer part as in U.S. Pat. No. 4,414,890, in which there is no upper limit to the size of the bearing therein. A particular advantage of the invention now becomes apparent because the setting device in accordance with the invention may be used for a roll with flexion compensation, as in U.S. Pat. No. 4,414,890. The bearing outer part or housing, which may be set with the aid of the present invention, will still be able to accommodate both the bearing means for the stationary end trunnion of the beam and also the bearing placed concentrically thereto for the roll shell.

Owing to the arrangement of the linear guide elements, i.e. elements which guide linear motion transversely of the roll axis, wherein they are disposed axially outside the bearing housing, namely in front of the outer end faces of the bearing housing and preferably directly on its outer side, it is possible for the linear guide elements to have a considerable length, i.e. height. In other respects, in the invention, the teachings of German Unexamined Specification DE-OS No. 3,007,112 are adhered to, i.e. with respect to keeping the linear guide elements separate from the setting means. Stated differently, it is no longer necessary for the setting means (as in German Unexamined Specification DE-OS No. 2,929,942) to fulfill the function of a linear guide as well. The setting means will at the most only have to assume a backup guide function complementing the function of the linear guide elements.

At each roll end, the point of engagement for the actuator means that move the roll should, as in the prior art, be generally at the middle of the bearing. In the event that the actuator means has several hydraulic cylinders at each end of the roll, for example, the resultant pressing force must be directed generally centrally through the middle of the bearing. This makes it possible to avoid bending moments in the bearing housings and in the machine frames when the pressing force is applied by the setting means.

Initially, there were misgivings regarding arranging the linear guide elements spaced from the middle of the bearing. However, on the one hand, the linear guide elements may be made comparatively long in the direction transverse to the axis since they are arranged at the outer end face of the bearing housing, as already mentioned. On the other hand, the point of engagement of the force of the actuator means is central both along the roll axis and transverse to the axis in relation to the bearing of the roll trunnion. These two features ensure that the linear guide elements operate without running skew or otherwise jamming.

Although the linear guide means are arranged externally of the bearing housing, their free running properties may be ensured by the following additional measures. Each cooperating pair of slidingly engaging materials on facing, engaging guide elements has one of the engaging surfaces comprised of a hard metallic material (as for example hardened stainless steel) while the other sliding surface is comprised of a plate of a wear resistant resin (for example, one based on PTFE).

A further significant development of the invention further reduces the space requirement of the setting device of the invention. To make this possible, at least one setting actuator cylinder, and preferably two of them, each in the form of a single acting cylinder which therefore is very short in length, is arranged in a plate. It is preferred for this plate to form a so-called guide chair together with a guide plate at the end. That chair is rigidly connected with the machine frame. If the mating roll is placed over the roll to be set so that the plate is arranged under the roll to be set, the plate may be termed the "base plate".

An additional actuator means may be provided to only act in the "negative" direction, i.e. so as to urge the roll clear of the mating roll. Those additional actuator means may engage the bearing housing like the other actuator means. In many cases, it is however better for the additional actuator means to engage the roll trunnion, since the latter usually projects from the bearing housing at its outer side. In this respect, the trunnion extends through a recess located between the linear guide elements which extend past the trunnion on both lateral sides. If the roll end pin is a rotary pin, i.e. in the form of a journal, an auxiliary bearing will be provided at the point of engagement of the additional actuator means. In the case of rolls with flexion adjustment means, which have a stationary trunnion, such an auxiliary bearing will not be needed.

For aiding in the guidance of the motion of the bearing housing, there may be a central linear guide hole in the base plate and a guide pin projecting from the bearing housing into that guide hole for guiding motion of the bearing housing transverse to the axis of the roll. In case such a guide pin in guide hole arrangement is provided, typically there are two of the actuating cylinders for the bearing housing, one at each lateral side of the central linear guide hole, so that the resultant pressing forces of the cylinders are directed generally centrally through the bearing.

Further developments of the invention and various possible embodiments thereof will not be described with reference to the drawings.

BRIEF DESCRIPTION OF THE DRAWINGS

FIG. 1 is an end-on view of a first embodiment of the setting device for a roll with a partial section taken on the line I—I of FIG. 3.

FIG. 3 is a plan view looking in the direction of the arrow III of FIG. 1.

Figure 2:
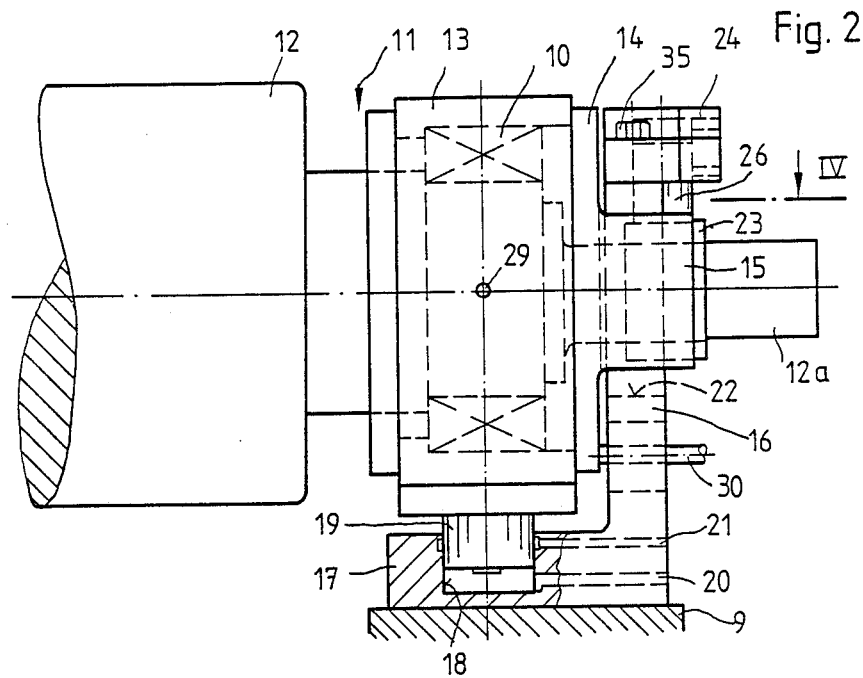
FIG. 2 is a side view of the first embodiment of the setting device as shown in FIG. 1 with a partial section taken on the line II—II of Fig. 4.
Figure 4:
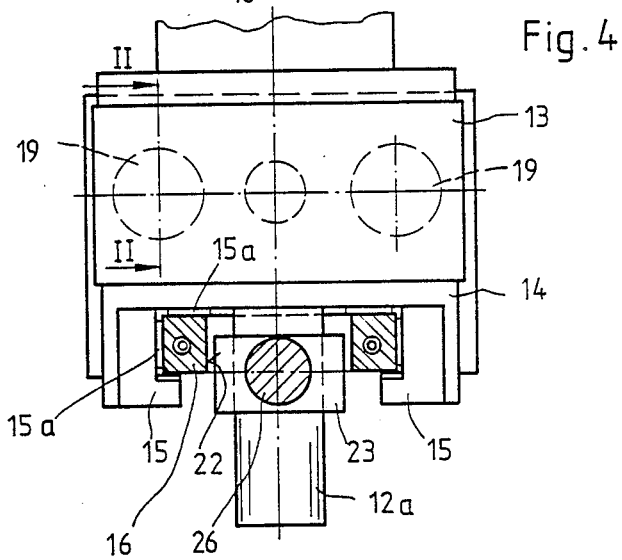
FIG. 4 is partly a side view and partly a section taken on the line IV of FIG. 2.

DESCRIPTION OF THE PREFERRED EMBODIMENTS:

FIGS. 1 through 4 show a setting device for a roll 11. The roll comprises an annular rotary roll shell 12 with a roll journal 12a at each end of the roll which is supported in a bearing outer part 13 by means of an antifriction bearing 10 (FIG. 2). The bearing outer part 13, its bearing 10, and thus the entire roll 11 are able to be moved vertically in Figs. 1 and 2. An end cover 14 with guide claws 15 spaced apart and spaced from journal 12a is rigidly secured to the bearing outer part 13. The guide claws 15 thus shift transversely of the axis of the roll, vertically in FIGS. 1 and 2, along with the bearing housing 13. The guide claws 15 are turned inwardly toward each other and fitted around a stationary, non-shifting end guide plate 16 whose base is connected to a base plate 17. The guide claws 15 and the guide plate 16 are coacting linear guide elements. The running surfaces of the guide plate 16 may be formed of hardened stainless steel, whereas the running surfaces on the cover 14 and on the guide claws 15 are formed by resin plates 15a (FIG. 4).

The guide plate 16 and the base plate 17 may be separate elements or, as illustrated here, are preferably combined as an integral L-shaped "guide chair". In any case, the guide plate 16 and the base plate 17 are rigidly connected to the machine frame 9 by screws, not shown. If the "guide chair" 16 and 17 is employed, it is possible to leave it on the roll when the latter is to be dismounted from the paper making machine. This facilitates roll replacement. As a departure from the design illustrated, the base plate 17 and/or the guide plate 16 may be made integral parts of the machine frame.

There are two vertical cylindrical holes 18 in the base plate 17 to receive vertically reciprocating actuator pistons 19. The pistons 19 project below a radial side of the bearing housing 13. Oil under pressure may be supplied to the holes or bores 18 through supply ducts 20. Conventional sealing rings between the cylinder bores 18 and the actuator pistons 19 are not shown. At the top ends of the cylinder bores 18, there are respective chambers for leaked oil. Such leaked oil collecting here may escape via exit ducts 21 and run to an oil tank through return lines, not shown.

In FIGS. 1 and 2, the oil pressure obtaining in the cylinder bores 18 acts on the actuator pistons 19 so that the pistons move the bearing outer part 13 a short distance clear of the base plate 17. There are control lines, not shown, for turning the oil pressure on and off and for changing the level thereof. If the oil pressure is discontinued, the bearing outer part will come down onto the base plate 17 under the weight of the roll 11 in the illustrated arrangement.

In FIGS. 1 and 2, it is thus assumed that the roll 11 is pressed upward against a mating roll 8 thereover (which is indicated only in FIG. 1). However, the pressing action may take place in any other direction, dependent on the position of the mating roll. For example, the pressing action may be downwardly directed. In this case, the entire arrangement would be inverted, so that the base plate 17 would be secured to a part of the machine so as to be above the bearing outer part 13.

To render the setting device suitable for all possible arrangements and applications, additional measures are adopted. The stationary terminal guide plate 16 has a central recess 22 (FIG. 1) for the roll journal 12a, on which an auxiliary bearing 23 is arranged. A bridge 24 has two ends which are screwed by screws 35 to the top of the stationary end guide plate 16. In the bridge, there is a cylindrical hole or bore 25 with a piston 26 running in it. Oil under pressure may be supplied to the bore 25 via a supply duct 27. For scavenging the leaked oil, there is a leaked oil duct 28. The additional cylinder or bore 25 is so dimensioned that, when the roll 11 is pressed downward against the mating roll, the piston 26 is able to move the roll 11 thereon clear of the mating roll against the effect of gravity on the roll 11. The antifriction bearing 10, located in the bearing outer part 13 may be supplied with lubricating oil via a supply duct 29. This oil is returned to a lubricating oil container for cooling via a return connector 30, for which an elongated opening 31 is provided in the end guide plate 16.

The base of the bearing outer part 13 is provided with an additional vertical guide pin 32 which slides in a vertical guide hole 33 oriented transversely to the roll axis and located in the base plate 17. In place of such a guide pin 32, it is also possible for the pistons 19 to be attached to the bearing outer part 13 and to perform a guiding function complementing the guiding action of the guide claws 15. This is more expedient if there is only a single pressure actuator cylinder, instead of two cylinder bores 18, to supply a small pressing force, with the single pressure cylinder being centrally placed in relation to the bearing outer part 13 in the base plate 17.

In accordance with a further possible design variation, the guide claws 15 alone could perform the function of guiding the bearing outer part 13 along the guide plate 16. In this case it is expedient if the guide claws 15 are extended downward, preferably as far as the lower end of the bearing outer part 13.

Figure 5:
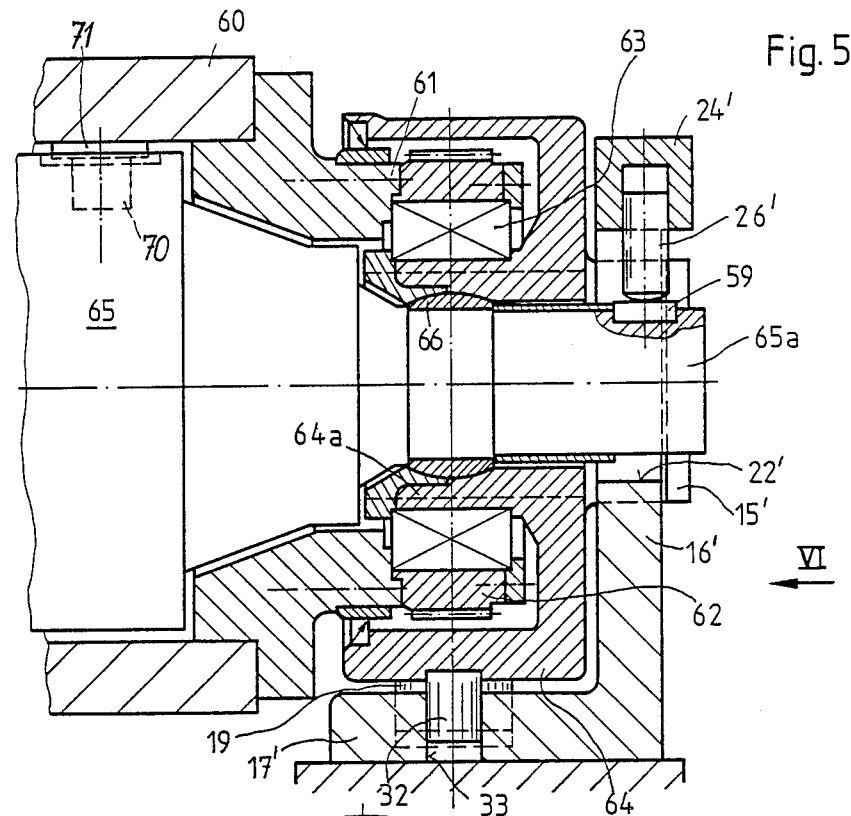
FIG. 5 is a longitudinal section taken through a further embodiment of the invention.
Figure 6:
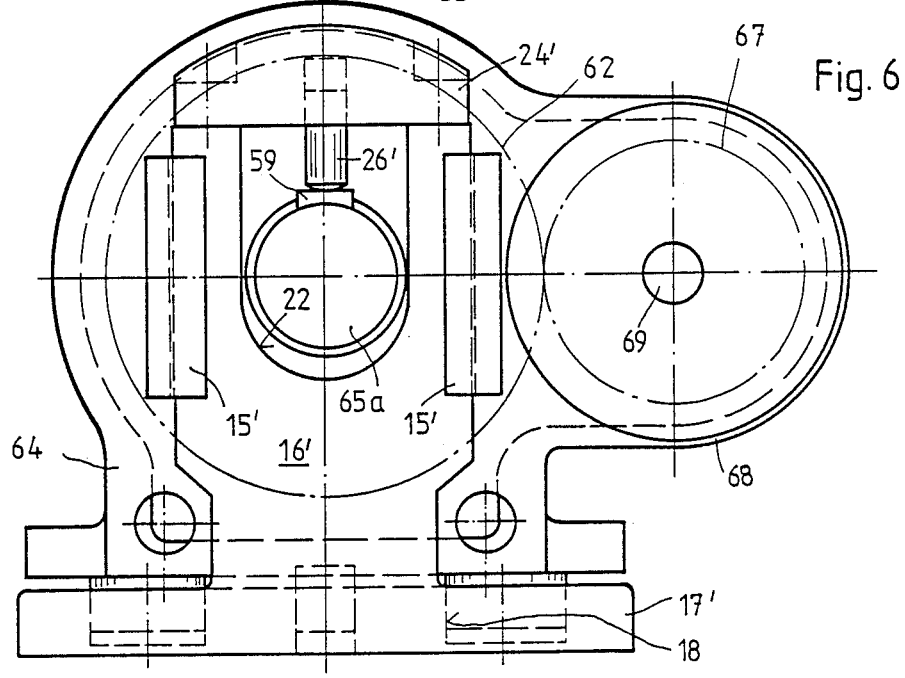
FIG. 6 is an end-on view looking in the direction of the arrow VI of FIG. 5.

FIGS. 5 and 6 show a setting device embodiment for a roll with flexion adjustment means. There is a rotary roll shell 60 connected with a bearing flange 61. On the outer end of the flange, a ring 62 of driving gear teeth is screwed in place. The rotary roll shell is borne on an adjustable bearing outer part 64 by way of the antifriction bearing 63 placed therein. The bearing outer part 64 has a tubular collar 64a extending into the interior of the journal so that the antifriction bearing 63 rests on the outside of the collar 64a.

A stationary beam 65 extends through the tubular roll shell 10. The beam has one terminal trunnion 65a supported in a spherical bushing 66, which engages the inner face of the collar 64a of the bearing outer part 64. Hydraulic supporting means are provided in a conventional way between the beam and the roll shell in order to transmit the pressing forces. They comprise a row of hydraulically pressurized pistons 70 on the beam 65, in the plane of the axes of the roll shell 60 and the mating roll, extending to respective shoes 71 which are hydraulically pressed against the interior of the roll shell 60 to support the shell against flexing.

In order to enable the roll to be pressed on a mating roll (not shown) and to move it away from the mating roll again, there is a guide chair comprising, as in FIGS. 1 through 4, a guide plate 16' and the base plate 17'. Guide claws 15' formed on the bearing outer part 64 again fit around the guide plate 16'. In the base plate 17' there are again two cylinder bores 18 with actuator pistons 19. An additional guide pin 32 is also secured to the lower side of the bearing outer part 64. It runs in the guide hole 33 of the base plate 17'. The guide plate 16' again has a recess 22' between the guide claws 15' to receive the trunnion 65a of the beam 65. Over that recess extends a bridge 24' which is secured to the guide plate 16'. A hydraulic actuator piston 26' is located in the bridge. The piston 26' engages the terminal trunnion 65a with an abutment head to exert a return force thereon and, therefore, on the entire roll.

The bearing outer part 64 at the same time forms the housing for gearing for driving the roll shell 60. In FIG. 6, a drive pinion 67 is supported by bearings in a lateral extension 68 of the bearing housing 64. The drive pin 69 of the pinion 67 may be connected with a motor via a number of drive parts which are not shown. The drive pinion meshes with the above-mentioned ring 62 of teeth on the roll flange 61.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A setting device for changing the position of a roll in a transverse direction with respect to a mating roll that is disposed side to side with respect to the roll, the roll having a longitudinal axis and the setting device being operable for moving the roll transverse to the roll axis in a first direction toward and in a second direction away from the mating roll, the setting device comprising:

the roll having opposite longitudinal ends and support means at the ends of the roll for supporting the roll while it rotates; a respective bearing rotatably supporting the roll on the support means ; a respective bearing housing containing the bearing at the support means at the end of the roll and adjustable with the roll;

a stationary base; actuator means supported to the base and engaging the bearing housing and supporting the bearing and being movable for moving the bearing housing and the bearing, for moving the support means for moving the roll transversely to the roll axis and with respect to the base; along the direction across the roll axis, the actuator means is at least approximately centered on the bearing;

first and second linear motion guide elements arranged at the axial outer end of the bearing housing and supported respectively to the bearing housing and to the base for guiding linear motion of the bearing housing and of the roll with respect to the base transversely to the longitudinal axis of the roll.

2. The setting device of claim 1, wherein the actuator means is disposed at a radial side of the support means and of the roll that is opposite to a radial position where the mating roll and the roll are in operative cooperation.

3. The setting device of claim 1, wherein in a direction normal to the roll axis, the center of the actuator means is at least approximately in the center of the bearing.

4. The setting device of claim 1, wherein the linear motion guide elements comprise a first guide element on the bearing housing and a second cooperating guide element on the base, the guide elements normally being in engagement for guiding linear motion of the bearing housing with respect to the base and generally in the linear direction transverse to the longitudinal axis of the roll.

5. The setting device of claim 4, wherein one of the linear guide elements is comprised of a hard metallic material and the other linear guide element in engagement therewith is comprised of a wear-resistant resin material.

6. The setting device of claim 2, wherein the base further comprises a base plate away from the mating roll extending generally parallel to the longitudinal axis for being secured to a machine part separate from the roll; and the actuator means is disposed in the base plate, means in the base plate for moving the actuator means; the actuator means extending to the bearing housing for moving the bearing housing.

7. The setting device of claim 6, wherein the base plate and the second cooperating guide element are positioned at the axial outer end of the bearing housing and are combined in a single stationary unit, and the first guide element is supported on the bearing housing for moving with respect to the second guide element.

8. The setting device of claim 6, further comprising a guide hole in the base plate extending transversely to the roll axis; a guide pin on the bearing housing and movably extending into the guide hole; the actuator means comprising a hydraulic cylinder bore having a piston movably disposed in the base plate and the cylinder bore, the cylinder bore and the piston being directed for moving the bearing housing with respect to the base plate, and the guide pin riding in the guide hole for directing the motion of the bearing housing and actuator means with respect to the base plate.

9. The setting device of claim 6, further comprising a central linear guide hole in the base plate extending transversely to the roll axis; a guide pin on the bearing housing and extending into the guide hole for moving therein transversely to the axis of the roll, for guiding the motion of the bearing housing and actuator means with respect to the base plate guiding the transverse motion of the roll;

the actuator means comprising two hydraulic cylinder bores defined in the base plate and comprising a respective piston in each of the hydraulic cylinder bores and connected with the bearing housing, such that pressurization of the hydraulic cylinder bores moves the pistons and thereby moves the bearing housing; the hydraulic cylinder bores and the respective pistons being placed at opposite sides of the linear guide hole with respect to the longitudinal axis of the roll, and the resultant pressing force of the hydraulic cylinders being thereby directed generally centrally through the bearing at the respective end of the roll.

10. The setting device of claim 1, wherein the actuator means acts for moving the bearing housing in the first direction for moving the roll toward the mating roll.

11. The setting device of claim 10, further comprising additional actuator means for the roll support means at the radial side of the support means toward the mating roll for acting on the support means in the second direction, opposite the first direction, for urging the roll in the second direction away from the mating roll, said additional actuator means being disposed at the axial outer end of the bearing housing.

12. The setting device of claim 11, wherein the linear guide elements extend transversely to the longitudinal axis of the roll and are of a length to extend from the base generally past the roll support means.

13. The setting device of claim 12, wherein the additional actuator means extends to the roll support means and extend partially past the cooperating linear guide elements.

14. The setting device of claim 13, wherein the second guide element attached to the base plate includes a recess defined in it through which the support means extends, and the first guide element on the bearing housing extends past the support means and partially past the recess through which the support means passes.

15. The setting device of claim 14, wherein the additional actuator means is supported to the first guide element which is supported to the base plate; a support for the additional actuator means and that support extends across the recess the latter being in the first linear guide element.

16. The setting device of claim 1, wherein the roll comprises a hollow rotary roll shell rotatable around the longitudinal axis of the roll.

17. The setting device of claim 16, wherein the roll is an adjustable flexion roll; the support means for the roll are hollow, the bearing housing includes a tubular collar extending into the interior of the roll shell support means, the roll is rotatably supported on the exterior of the collar of the bearing housing and the bearing is between the support means and the collar, a stationary support beam extending through the roll and being supported on the interior of the collar, and hydraulic support means arranged between the roll shell and the beam.

18. The setting device of claim 17 wherein the actuator means and additional actuator means are operatively connected with the beam.

19. The setting device of claim 17, further comprising a support beam extending through the hollow roll shell, hydraulic support means arranged between the roll shell and the beam, the beam being supported in the interior of the collar of the bearing housing.

20. The setting device of claim 1, wherein the roll has a cross-section defined by the diameter of the roll and the bearing housing has a cross-section not greater than the diameter of the roll.

* * * * *